(12) United States Patent
Baxter

(10) Patent No.: US 6,409,873 B1
(45) Date of Patent: Jun. 25, 2002

(54) PROCESS AND APPARATUS FOR BONDING A PAIR OF DUCTS TOGETHER IN WHICH A REMOVABLE MEMBER IS USED TO HELP SUPPORT AND MAINTAIN ALIGNMENT BETWEEN THE DUCTS DURING BONDING

(75) Inventor: Michael R. Baxter, Chanhassen, MN (US)

(73) Assignee: FSI International, Inc., Chaska, MN (US)

( * ) Notice: Subject to any disclaimer, the term of this patent is extended or adjusted under 35 U.S.C. 154(b) by 0 days.

(21) Appl. No.: 09/233,873

(22) Filed: Jan. 20, 1999

(51) Int. Cl.$^7$ .......................... B29C 65/20; B29C 65/78
(52) U.S. Cl. ................ 156/297; 156/304.2; 156/304.6; 156/499; 156/503
(58) Field of Search ..................... 156/304.2, 304.6, 156/499, 503, 297, 556, 559

(56) References Cited

U.S. PATENT DOCUMENTS

| | | | |
|---|---|---|---|
| 670,236 A | * 3/1901 | Kelly | |
| 2,487,816 A | 11/1949 | Lindsey | ......................... 216/29 |
| 3,052,163 A | 9/1962 | Schubert | ......................... 93/1 |
| 3,328,223 A | * 6/1967 | Fink | |
| 3,723,229 A | * 3/1973 | Hutton | |
| 3,841,668 A | * 10/1974 | Williams | |
| 3,841,938 A | * 10/1974 | Grosse-Holling et al. | |
| 3,959,058 A | 5/1976 | Rath et al. | |
| 3,998,478 A | * 12/1976 | Zopfi | |
| 4,258,935 A | * 3/1981 | Rodrigo et al. | |
| 4,366,014 A | 12/1982 | Pollard | ......................... 156/157 |
| 4,407,691 A | 10/1983 | Ishii et al. | ............... 156/304.2 |
| 4,576,666 A | 3/1986 | Harris et al. | |

(List continued on next page.)

FOREIGN PATENT DOCUMENTS

| | | | |
|---|---|---|---|
| DE | 2106162 | * | 6/1972 |
| DE | 129 750 | | 2/1978 |
| DE | 129758 | | 2/1978 |
| DE | 197 27 236 | | 1/1999 |
| EP | 0 405 658 A2 | | 1/1991 |
| EP | 868994 | * | 10/1998 |
| EP | 0 868 994 | | 10/1998 |
| JP | 57 064513 | | 4/1982 |
| JP | 58-28332 | * | 2/1983 |
| JP | 58-28333 | * | 2/1983 |
| JP | 58 028333 | | 2/1983 |
| JP | 01 141722 | | 6/1989 |
| JP | 08 142200 | | 6/1996 |
| WO | 94/07673 | * | 4/1994 |

OTHER PUBLICATIONS

PCT International Search Report for International Application No. PCT/US00/01271 (4 pages.).
FSI Mercury® spray processing systems product brochure, 8 pages. (No date).

*Primary Examiner*—Steven D. Maki
(74) *Attorney, Agent, or Firm*—Kagan Binder PLLC

(57) ABSTRACT

The present invention provides a method of joining a mating face of a first through duct to a mating face of a second duct. Specifically, the method includes bonding the first duct mating face to the second duct mating face to form a bonded structure while the ducts are supported in alignment with each other on an alignment member. Once so bonded, the alignment member may be removed from the bonded structure. Advantageously, the method of the present invention provides an approach for accurately joining ducts together such that the joint is clean, accurate, nondistorted, durable, and impermeable to metal ions. Furthermore, the resultant joints are extremely uniform, and are easy and economical to make using simple equipment, thus making the present invention particularly useful in mass production.

7 Claims, 13 Drawing Sheets

U.S. PATENT DOCUMENTS

| | | |
|---|---|---|
| 4,579,617 A | 4/1986 | Öberg et al. ................. 156/184 |
| 4,929,293 A | 5/1990 | Osgar ......................... 156/158 |
| 4,957,570 A | 9/1990 | Jenkins et al. ................ 156/64 |
| 4,990,206 A * | 2/1991 | Garske et al. |
| 5,067,842 A * | 11/1991 | Ponting |
| 5,183,524 A * | 2/1993 | Dommer et al. |
| 5,298,713 A | 3/1994 | Marlin ................. 219/121.46 |
| 5,328,541 A | 7/1994 | Usui et al. ............... 156/304.2 |
| 5,441,588 A * | 8/1995 | Kime et al. |
| 5,478,123 A * | 12/1995 | Kanao |
| 5,609,713 A | 3/1997 | Kime et al. ............... 156/304.2 |
| 5,622,592 A * | 4/1997 | Tanner et al. |
| 5,687,976 A * | 11/1997 | Andrick et al. |
| 6,001,291 A * | 12/1999 | Cesaroni |
| 6,120,719 A * | 9/2000 | Rozelle et al. ............... 264/248 |

* cited by examiner

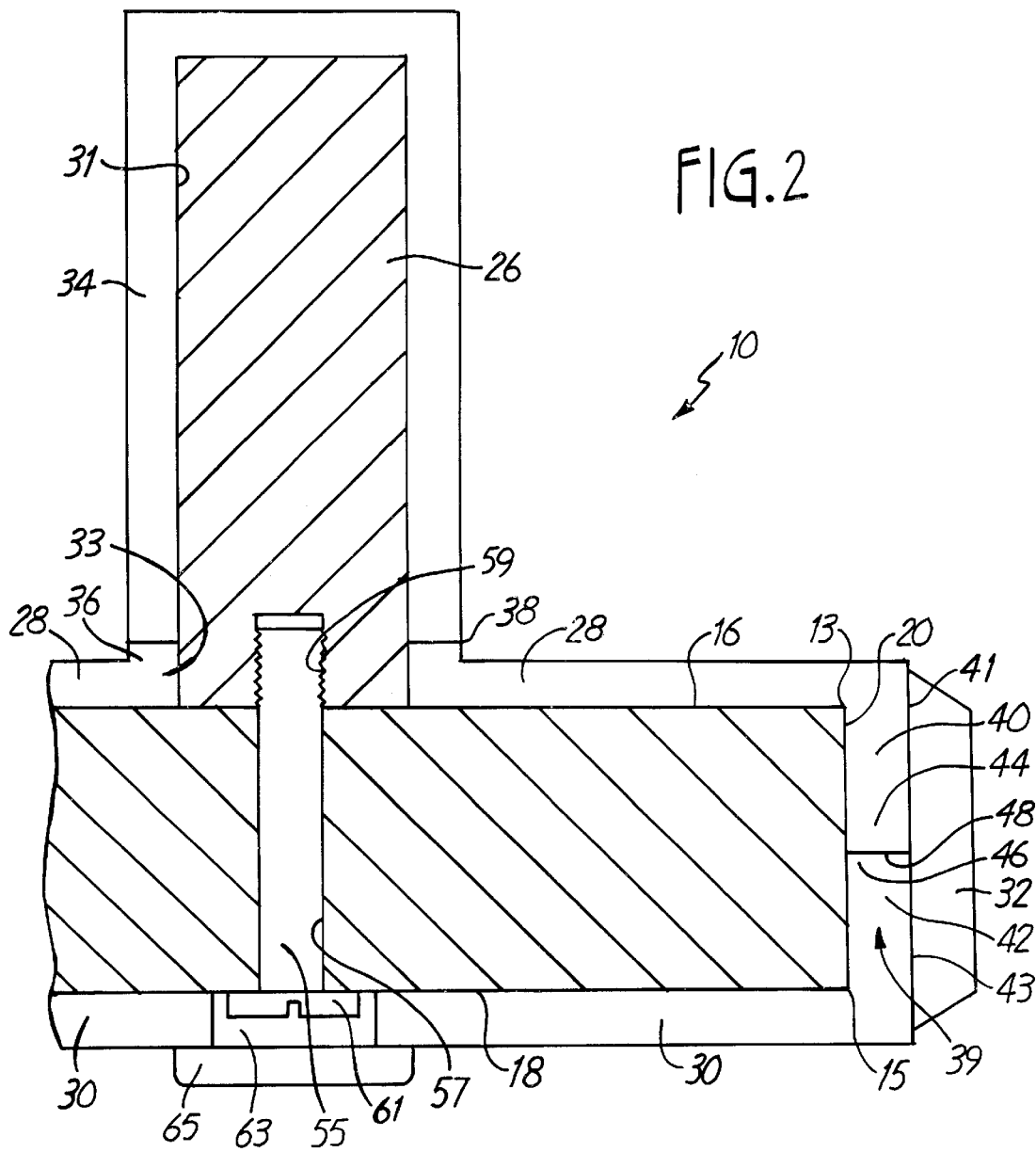

PROCESS AND APPARATUS FOR BONDING A PAIR OF DUCTS TOGETHER IN WHICH A REMOVABLE MEMBER IS USED TO HELP SUPPORT AND MAINTAIN ALIGNMENT BETWEEN THE DUCTS DURING BONDING

FIELD OF THE INVENTION

The present invention is in the field of forming joints between pipes, ducts, and fittings. The present invention is particularly useful in joining ducts together in order to preassemble encapsulating structures for processing equipment used in the manufacture of microelectronic devices, particularly with inert polymer materials, because the resultant joints between the encapsulation member components are accurately aligned, substantially distortion free, strong for long service life, and impermeable to metal ions.

BACKGROUND OF THE INVENTION

There are many circumstances in which it is desirable to encapsulate a substrate with some kind of protective barrier. In some circumstances, encapsulation can be used to protect the substrate from the environment in which the substrate will be used. For example, encapsulation is useful when the substrate is a metal component or the like that is to be used in a marine environment where salt water or the corresponding vapor or mist can corrode or otherwise damage the unprotected component. Encapsulation can also be used to protect processing equipment to be used in acidic, basic, reducing, or oxidizing environments.

In other circumstances, it may be desirable to protect items in the environment from the substrate itself. For instance, one step of manufacturing microelectronic devices involves processing those devices while the devices are supported upon some kind of structure, such as a wafer cassette, platform, transport apparatus, rotating turntable, and/or the like. For strength, rotating turntables and other structures used to process microelectronic devices are often formed from one or more metals, metal alloys, intermetallic compositions, or the like. Unfortunately, metal ions from such metallic structures can migrate from the structures into the devices being processed. This is especially problematic and may even destroy the functional capability of the devices. To protect microelectronic devices from contamination during processing, the industry has encapsulated one or more components of the processing equipment in an inert polymer, e.g., a fluoropolymer such as perfluoroalkoxy polymer (PFA), a fluoroethylene polymer (FEP), an ethylene tetra fluoroethylene polymer, (ETFE), a polyvinylidene fluoride polymer (PVDF), a polyvinyl fluoride polymer (PVF), combinations of these, and the like.

To encapsulate a particular structure with an inert polymer, one or more encapsulating parts may be preformed and then assembled around the structure. The parts may be joined using glue, fusing techniques, or the like. In the microelectronics industry, the encapsulating joints must be strong enough so that the encapsulated structure can withstand the rigors of use over a reasonably long service life. If the substrate comprises metal, the encapsulation joint should be impermeable to metal ions.

Forming encapsulating joints that meet the stringent demands of the microelectronic industry has been extremely challenging. The difficulty is due, at least in part, to the complex geometry of the structures that require encapsulation. For example, the MERCURY® centrifugal spray processors commercially available from FSI International, Chaska, Minn., each include an encapsulated, rotating turntable that supports several wafer cassettes during processing. This turntable has projecting, upright structures including uprights that help hold the wafer cassettes. It previously has been difficult and time consuming to satisfactorily bond encapsulating structures in position over these uprights. Generally, to form such an encapsulating structure, an encapsulating top cover is positioned over the top of the turntable. The top cover has a number of apertures matched to the upright structures so that the uprights project upward through these apertures when the cover is in place. Encapsulating sleeves are placed over these uprights and then bonded to the top cover. In short, the encapsulating structure is assembled around the turntable.

It would be much more desirable to be able to preassemble the top cover and sleeves and then fit the preassembled structure over the uprights and turntable like a glove. However, there are a number of challenges that would have to be overcome in order for this approach to be feasible. First, the sleeves must be accurately positioned when bonded to the cover. To appreciate this, it is helpful to consider that the pre-assembly of the sleeve and cover generally involves joining the mating faces of a pair of ducts together. The sleeve is a duct closed at one end, but open at the other. The cover itself will include a number of through apertures through which the uprights of the turntable project when the cover is positioned over the turntable. The open end of the tube must be bonded to the cover so that the opening of the tube is accurately positioned over a corresponding opening through the cover. Any misalignment between these ducts may prevent the pre-assembled cover from properly fitting over the turntable.

Additionally, methods for bonding encapsulating components together require that the mating faces of the parts be pressed into contact with each other using some pressure while the joint between the parts fuses. Depending upon whether glue or fusion techniques are being used, a bead of glue or molten material, as the case may be, tends to form around the joint on both the inside and outside of the resultant structure. The formation of such a bead on the interior is particularly problematic because the bead reduces the interior cross-section of the structure. The reduced cross-section can make it difficult, or impossible, to fit the encapsulated structure over the turntable, even if alignment between the bonded parts is accurate.

Third, the cross-sectional shape of each sleeve is generally carefully matched to that of the corresponding upright so that the sleeve fits over the upright with little, if any, play. In some instances, the methods used to press the sleeve into bonding contact with the cover during a conventional pre-assembly can distort the cross-section of the sleeve. This distortion, too, tends to cause a poor fit over the turntable uprights.

Fourth, the bond must be strong enough to withstand the rigors of the intended use. If the bond fails, the integrity of the encapsulating structure is obviously compromised. Desirably, therefore, the joint between components should be at least as strong as the materials being joined.

Preassembling encapsulating structures is not the only situation in which mating faces of ducts must be accurately bonded together. Indeed, this issue arises in any circumstance in which ducts, whether encapsulating components, pipes, fittings, or the like, are joined together. For example, when joining pipes together to form a fluid transport system, misalignment, bead formation on the interior of joined pipes, a weak joint, and/or distorted cross-sections can impede fluid flow through the assembled pipes. In some instances, larger, more expensive pumps might be required to provide fluid transport due to the additional, undue pressure drop caused by such problems. In other instances in which fluids must be transferred through piping under laminar flow conditions, such problems can cause intolerable turbulence to occur.

There is thus a continuing need for improved processes and structures for accurately joining ducts together, particularly when pre-assembling encapsulating structures or when assembling networks for transporting fluids. An effective and efficient process and apparatus that provides a clean, accurate, nondistorted, durable, impermeable bond between duct components would be highly desirable.

SUMMARY OF THE INVENTION

The present invention advantageously provides an approach for accurately joining ducts together such that the joint is clean, accurate, nondistorted, durable, and impermeable to metal ions. The present invention is based, at least in part, upon the concept of using a removable alignment member that can be used to support ducts while the ducts are being joined. The resultant joints are extremely uniform, making the present invention particularly useful in mass production. For example, the present invention can be used to mass produce pre-assembled encapsulating structures subject to relatively tight specifications. The joints between ducts are easy and economical to make using simple equipment. The joints can be made using any kind of joining technique, such as gluing, welding, or the like. Welding is the preferred technique for joining thermoplastic ducts.

In one aspect, the present invention provides a method of joining a mating face of a first through duct to a mating face of a second duct. specifically, the method comprises the steps of:

(a) bonding the first duct mating face to the second duct mating face to form a bonded structure, said bonding occurring while the ducts are supported in alignment with each other on an alignment member; and (b) after bonding the mating faces of the ducts together, causing the alignment member to be removed from the bonded structure.

In another aspect, the present invention provides a method of encapsulating at least a portion of an article comprising a surface and a plurality of structures projecting from the surface. In particular, the method comprises the steps of:

(a) providing a first encapsulating component comprising a plurality of through ducts, said through ducts corresponding to at least a portion of said projecting structures such that said portion of the projecting structures fit through the through ducts when the first encapsulating component is positioned over the surface of the article;

(b) providing a second encapsulating component comprising a duct corresponding to a through duct of the first encapsulating component, said duct of the second encapsulating component defining at least a portion of an encapsulating chamber for receiving a projecting structure when the duct of the second encapsulating component is bonded to the corresponding duct of the first encapsulating component;

(c) bonding the duct of the second encapsulating component to the corresponding through duct of the first encapsulating component to form a pre-assembled encapsulating structure, said bonding occurring while the ducts are supported in alignment with each other on an alignment member;

(d) after bonding the ducts together, removing the alignment member from the pre-assembled encapsulating structure;

(e) optionally bonding one or more additional encapsulating components to the first encapsulating component; and (f) fitting the pre-assembled encapsulating structure over the article in a manner such that a projecting structure is received in the encapsulating chamber.

In yet another aspect, the present invention provides a method of joining a plurality of ducts of a plurality of polymeric members to corresponding through ducts of a polymeric body. In this embodiment of the invention, the method comprises the steps of:

(a) rotatably supporting the polymeric body such that at least one through duct is in a bonding position;

(b) bonding a polymeric member to the polymeric body such that the duct of said polymeric member is aligned with the through duct of the polymeric body in the bonding position;

(c) during bonding, causing an alignment member to be positioned inside the ducts to be bonded together such that the joint between the ducts is supported by said alignment member;

(d) after bonding, removing the alignment member from the bonded structure;

(e) rotating the polymeric body to cause at least one successive through duct to be in a bonding position; and (f) bonding at least one additional polymeric member to the polymeric body.

Finally, in yet another aspect, the present invention provides a method of forming an encapsulating structure, comprising the steps of:

(a) providing a first encapsulating component comprising a first face, a second face, and a through duct extending through the first encapsulating component from the first face to the second face;

(b) providing a second encapsulating component having a duct that extends from and end face of the second encapsulating component along at least a portion of the length of the second encapsulating component;

(c) positioning the end face of the second encapsulating component in a spaced apart and confronting relationship with the second face of the first encapsulating component such that the ducts of the components are aligned;

(d) heating the confronting faces of the first and second encapsulating components under conditions such that the end face and second face are fusibly weldable to each other;

(e) inserting an alignment member into the through duct of the first encapsulating component such that at least a portion of the alignment member extends from the second face of the first encapsulating component in a direction toward the end face of the second encapsulating component;

(f) fusibly contacting the end face and second face at a joint to form the encapsulating structure in which the ducts of the components cooperate to define an encapsulating chamber, said contacting occurring while the joint between the faces is supported by the alignment member; and (g) removing the alignment member from the encapsulating structure.

BRIEF DESCRIPTION OF THE DRAWINGS

FIG. 2 is a side cross-sectional view of a portion of the encapsulated turntable 5 of FIG. 1 showing how the encapsulating components are assembled around the turntable.

DETAILED DESCRIPTION OF THE REPRESENTATIVE EMBODIMENTS

The following embodiments of the present invention are not intended to be exhaustive or to limit the invention to the precise forms disclosed in the following detailed description. Rather the embodiments are chosen and described so that others skilled in the art may appreciate and understand the principles and practices of the present invention.

The present invention may be used to join a wide variety of different ducts together, including pipes, fittings, encapsulating structures, and the like. For purposes of illustration, however, the principles of the present invention will now be described in the context of forming an encapsulating structure used to encapsulate the rotatable turntable of the MER-CURY® centrifugal spray processors commercially available from FSI International, Chaska, Minn. The present invention is particularly useful for forming encapsulating structures, such as the structure used to encapsulate this turntable, because the resultant encapsulating joint is accurately aligned, substantially distortion-free, strong for long service life, chemically resistant, and impermeable to metal ions.

Figure 1:
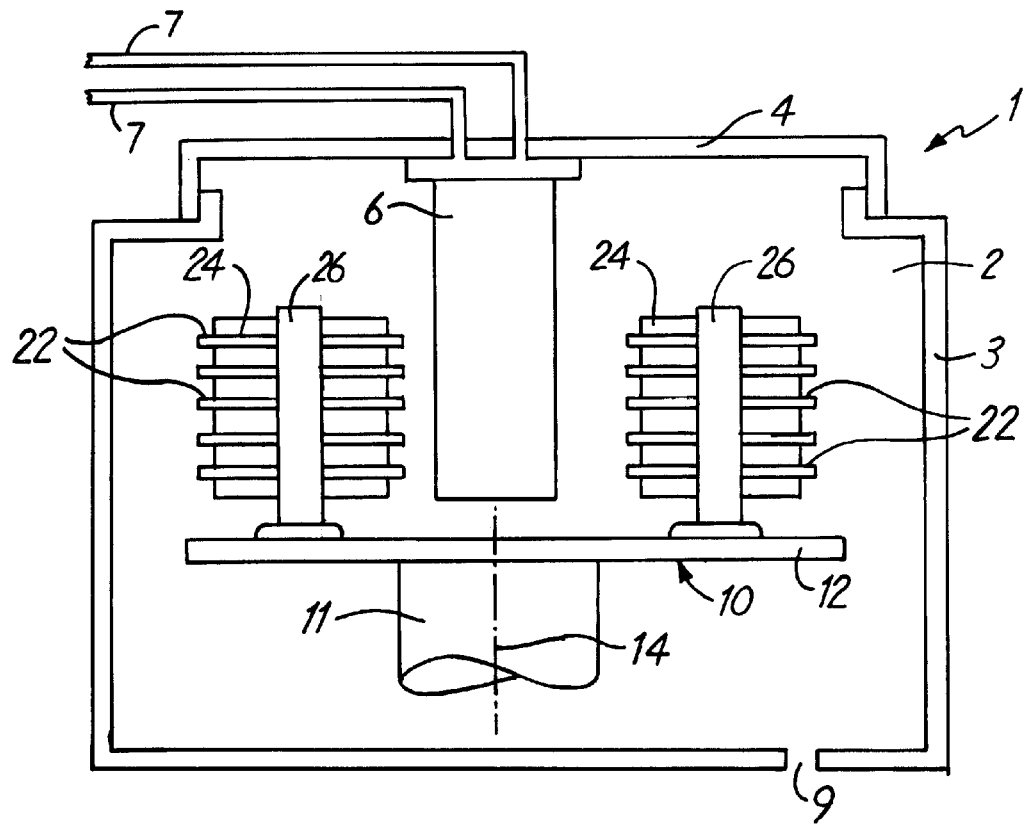
FIG. 1 is a schematic side view of a centrifugal spray processor incorporating an encapsulated turntable of the present invention.
Figure 3:
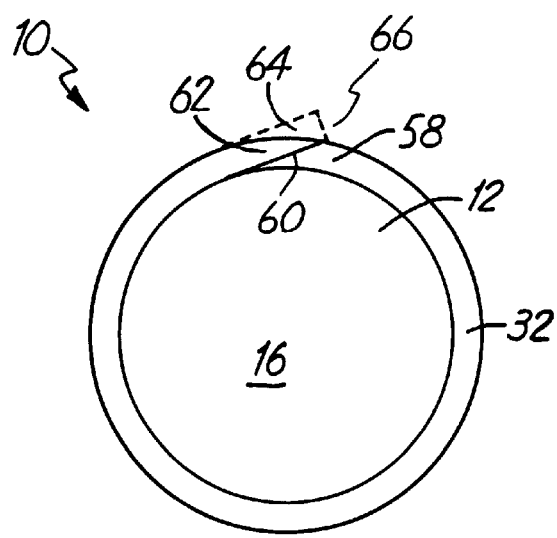
FIG. 3 is a cross-sectional top view taken along line 3—3 of FIG. 2 showing how the ends of the sideband are joined together.

FIGS. 1 to 3 schematically represent a representative MERCURY® centrifugal spray processing apparatus 1. Centrifugal spray processing apparatus 1 includes processing chamber 2 defined by housing 3 and lid 4. Encapsulated turntable 10 is rotatably mounted in processing chamber upon shaft 11 such that turntable 10 is rotatable about axis 14. One or more cassettes 24 holding semiconductor wafers 22 are supported above turntable platform 12 upon one or more corresponding encapsulated uprights 26. Spray post 6 delivers one or more processing chemicals onto wafers 22. The chemicals are supplied from suitable sources (not shown) via supply lines 7, as appropriate. Chemicals are discharged from processing chamber 2 through one or more outlets 9.

Turntable 10 includes turntable platform 12 including a top major surface 16, a bottom major surface 18, and a peripheral sidewall 20 interconnecting the top and bottom surfaces 16 and 18. As seen in FIG. 2, upright 26 is secured to top major surface 16 by bolt 55 that extends through aperture 57 and engages threaded aperture 59. Exposed head 61 of bolt 55 is covered within pocket 63 by bolt head cover 65.

Turntable platform 12 is encapsulated by top cover 28, bottom cover 30, sleeve 34, and sideband 32. As seen best in FIG. 2, each sleeve 34 is sealingly attached to a corresponding boss 36 on top cover 28 at a joint 38. Sleeves 34 are attached to bosses 36 using the attachment technique of the present invention, described in more detail below. In this manner, the uprights 26 of turntable platform 12 can extend through cover 28 and into sleeve 34 so as to be encapsulated to protect the surrounding environment from potential contamination from the metallic ions of turntable platform 12 and uprights 26. During wafer processing, the turntable 10 and cassettes 24 holding semiconductor wafers 22 rotate about the axis 14 as various chemical solutions are sprayed on the wafers 22. This technique, centrifugal spray processing, is commonly used to condition wafer surfaces at different stages in the semiconductor device manufacturing process.

The structure of the encapsulating joint 39 formed around the periphery of turntable platform 12 is seen best in FIG. 2. Joint 39 and methods of making it are described in more detail in Assignee's co-pending application, Ser. No. 09/216, 106, filed Dec. 18, 1998, incorporated herein by reference in its entirety. Generally, each major face of turntable platform includes a corresponding outer periphery 13 and 15. To form encapsulating joint 39, top cover 28 includes flange 40 that extends from top cover 28 to wrap around and extend partially across peripheral sidewall 20. Flange 40 thus has free end 44 that is distal from top cover 28, but proximal to flange juncture 48. Preferably, top cover 28 and flange 40 are dimensioned so that top cover 28 fits over turntable platform 12 with little if any free play between the top cover 28 and the turntable platform 12. In a similar fashion, bottom cover 30 includes flange 42 that wraps around and extends partially across peripheral sidewall 20. Flange 42 thus has free end 46 that is proximal to flange juncture 48. Preferably, bottom cover 30, including its flange 42, is dimensioned so that bottom cover 30, like top cover 28, fits over turntable platform 12 with little if any free play between bottom cover 30 and turntable platform 12. Each of flanges 40 and 42 has its own peripheral sidewall 41 and 43, respectively, that is positioned beyond the outer peripheries 13 and 15. Sidewalls 41 and 43 thus provide unobstructed bonding surfaces for attaching sideband 32.

Flanges 40 and 42 may extend across peripheral sidewall 20 towards each other such that free ends 44 and 46 meet and contact each other along at least a portion, and more preferably substantially along the entirety of, flange juncture 48, as shown. This is a preferred configuration, because this allows free ends 44 and 46 to be attached to each other by fusing or the like along one or more portions, or the entirety if desired, of flange juncture 48. This not only helps form a better encapsulating seal at encapsulating joint 39, but also makes it easier to hold top and bottom covers 28 and 30 on turntable platform 12 while sideband 32 is attached to flanges 40 and 42. Sideband 32 extends around at least a portion, more preferably all, of peripheral sidewalls 41 and 43 so that sideband 32 overlies flange juncture 48. This structure advantageously allows sideband 32, flange 40 and flange 42 to cooperate to form an excellent encapsulating joint 39 around the periphery of sidewall 20.

As seen best in FIG. 3, sideband 32 optionally has a first end 58 configured with taper 60 and a second end 62 that overlies and is attached to taper 60 at first end 58. Taper 60 allows second end 62 to fit flush over first end 58. Excess material 64 of second end 62 can be removed to provide sideband 32 with a smooth contour over joint 66 between ends 58 and 62. Preferably, as shown in FIG. 2, sideband 32 is undersized relative to the total width from the top and bottom of encapsulated turntable 10 so that no portion of sideband 32 extends upward above the encapsulated top major surface 16 of turntable 10 or downward below the encapsulated bottom major surface 18 of turntable 10. Such undersizing is desirable in connection with turntable 10, because oversized portions of sideband 32 that project too far upward or downward could interfere with the flow of liquid off of turntable 10 as it rotates during processing. Of course, in other applications in which the present invention might be used, oversized portions forming a lip around the periphery of an encapsulated substrate may be desirable.

The top and bottom covers 28 and 30, sleeve 34, and sideband 32 may be formed from a wide variety of different encapsulating materials depending upon the nature of the substrate being encapsulated and the type of benefit that encapsulation is desired to achieve. For instance, when encapsulating a metallic component of a semiconductor processing apparatus such as apparatus 1 of FIG. 1, the encapsulating components are preferably formed from one or more polymer materials that prevent metal ions from the metallic component from undesirably contaminating wafers 22. The polymer materials also desirably have characteristics enabling the encapsulating components to withstand the expected processing conditions so that the encapsulated component has a reasonable service life. For example, if polymeric, the encapsulated material should not melt, bum, or otherwise degrade at the highest expected use temperature. The polymer materials should also be inert with respect to not only semiconductor wafers 22 but also to the chemical materials used to process wafers 22. The polymers may be thermoplastic or thermosetting, but are preferably thermoplastic so that the different encapsulating components can be fusibly bonded to each other to facilitate forming a welded joint.

With these concerns in mind, top and bottom covers 28 and 30, sideband 32, and sleeve 34 preferably comprise one or more inert, thermoplastic fluoropolymers. Fluoropolymers offer many processing advantages. Firstly, fluoropolymers tend to be inert to many different kinds of chemicals, including acidic and basic chemicals, and also form an excellent barrier around metallic turntable platform 12. Fluoropolymers also tend to have high melting temperatures, so as to provide encapsulating protection at relatively high use temperatures. Representative examples of fluoropolymers include a fluoropolymer such as perfluoroalkoxy polymer (PFA), a fluoroethylene polymer (FEP), an ethylene tetra fluoroethylene polymer, (ETFE), a polyvinylidene fluoride polymer (PVDF), a polyvinyl fluoride polymer (PVF), combinations of these, and the like. Of these, PFA is preferred, because this polymer is melt processable, may be readily molded and machined, is inert to many chemicals used to process microelectronic devices, is impermeable to metal ions when used as an encapsulating, material, and has a high service temperature.

According to one conventional approach, the top cover 28 and sleeve 34 components would have been individually fitted over turntable platform 12 and bonded to each other in place. As this conventional procedure would be applied to the encapsulation structure shown in FIGS. 1 to 3, top cover 28 would be placed over turntable platform 12 with uprights 26 projecting upward through apertures 33 of bosses 36. Sleeves 34 would then be slid over uprights 26 and bonded to the bosses 36 of top cover 28. The bottom cover 30 would be fitted over the bottom major surface 18 of turntable platform 12, and side band 32 would be used to bond top cover 28 to bottom cover 30. These components would be bonded together using conventional techniques, such as by gluing, welding, or the like.

Such a "fit and glue" process, however, is inefficient, both in terms of cost and time, particularly when the encapsulated substrate has a complex geometry, as is the case with turntable 10. In contrast to this conventional approach, the present invention allows the sleeves 34 and top cover 28 to be pre-assembled and then fit over uprights 26 and turntable platform 12 like a well-fitting, tailor-made glove. Normally, pre-assembling sleeve 34 and top cover 28 together in an accurate, well-fitting manner would be expected to be difficult. Sleeves 34 and corresponding bosses 36 maybe difficult to align properly. The joint 38 might be enlarged or crooked. These kinds of defects are not tolerable, because even slight misalignment or sloppiness in joints 38 could prevent the pre-assembled structure from fitting in place. Even if a poor fit might still be attachable, the service life or service quality of the encapsulated turntable 10 could be adversely affected.

Advantageously, these problems are overcome by the present invention. The present invention provides an approach that allows sleeves 34 and top cover 28 to be easily and effectively assembled with clean, accurate joints. Resultant encapsulating structures fit snugly over the uprights 26 and turntable platform 12. FIGS. 4 to 8 show a preferred methodology of the present invention.

Figure 4:
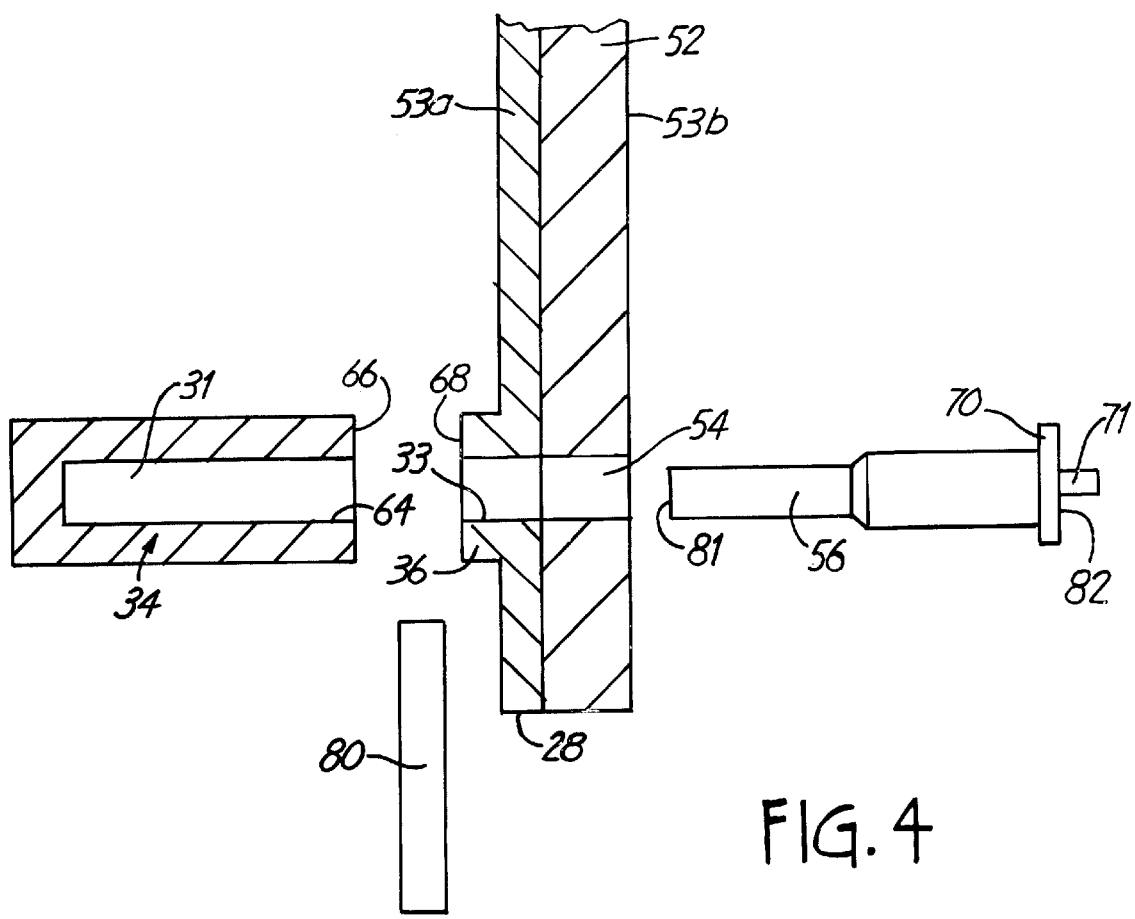
FIG. 4 is a side schematic view illustrating a first step in one representative methodology for bonding ducts together in accordance with the present invention, wherein a mating face of a sleeve is in a confronting relationship to a corresponding duct on a top cover, said top cover being supported on a jig while a heater and an alignment member are in withdrawn positions.

Referring first to FIG. 4, top cover 28 is releasably mounted onto first side 53a of support jig 52. The method of mounting cover 28 to jig 52 is not critical, and any convenient technique can be used such as clamps, snap fit engagement, vacuum, screws, bolts, releasable adhesive, combinations of these, and the like.

Jig 52 is preferably provided with a plurality of apertures 54 extending through jig 52 from first side 53a to second side 53b matched to apertures 33 of top cover 28 so that each matching set of apertures 54 and 33 are aligned when cover 28 is secured to jig 52. Sleeve 34 is positioned in a spaced apart, confronting relationship to corresponding boss 36. Initially, both alignment member 56 and heater 80 are in withdrawn positions. Alignment member 56 is preferably in the form of a mandrel having first end 81 and second end 82. Proximal to first end 81, the mandrel has a reduced cross-section to facilitate entry into interior 31 of sleeve 34. Proximal to second end 82, the cross-section of the mandrel is matched to the cross-section of aperture 33 of boss 36 and mouth 64 of sleeve 34. The matched cross-section allows alignment member 56 to firmly and snugly support sleeve 34 and boss 36 during the bonding step described below. Flange 70 on alignment member 56 serves as a stop to ensure that alignment member 56 is inserted the proper distance through jig 52 and top cover 28. Stem 71 provides a bearing surface for pushing alignment member 56 into position and also serves as a means for gripping alignment member 56 when removed from jig 52.

Heater 80 can be any heating device that can apply sufficient heat to mating faces 66 and 68 of sleeve 34 and boss 36, respectively, to allow these faces to be fused together. A preferred heater 80 is an infrared heater having opposed, parallel major faces. Each face is capable of radiating heat towards respective components whose mating faces are to be melted for fusing. Preferably the surface temperature of the faces can be controllably adjusted at a temperature in the range of from about 400° C. to about 700° C.

Figure 5:
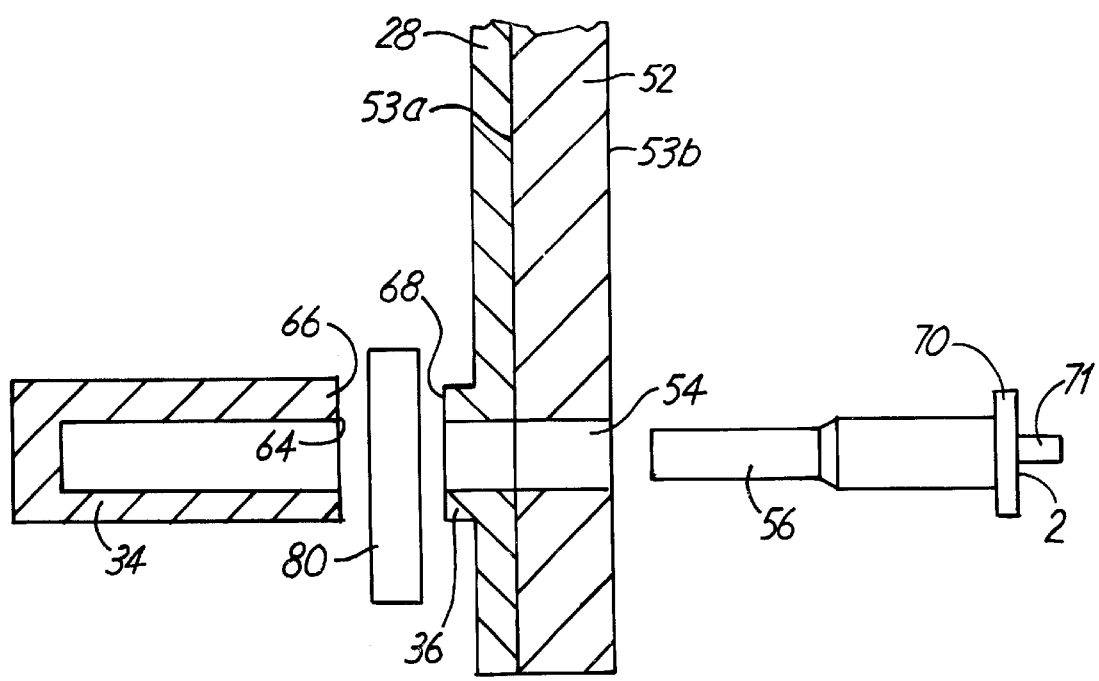
FIG. 5 is a side schematic view of a second step in the methodology of FIG. 4, wherein the heater has been raised to a heating position between the mating faces of the sleeve and the cover.

In the next step, shown in FIG. 5, heater 80 is placed into a heating position so that it can direct heat at mating faces 66 and 68. In the preferred embodiment in which heater 80 is an infrared heater, heater 80 is actuated to emit a sufficient fluence of infrared heat for a sufficient amount of time to melt mating faces 66 and 68 so that mating faces 66 and 68 can be fused together. When sleeve 34 and bosses 36 are formed from a polymeric material such as PFA or the like, mating faces 66 and 68 are ready to be fused when mating faces 66 and 68 are heated to a temperature above the polymer melt temperature. At this time, mating faces 66 and 68 are now ready to be brought into contact to form a strong, impermeable weld.

Figure 6:
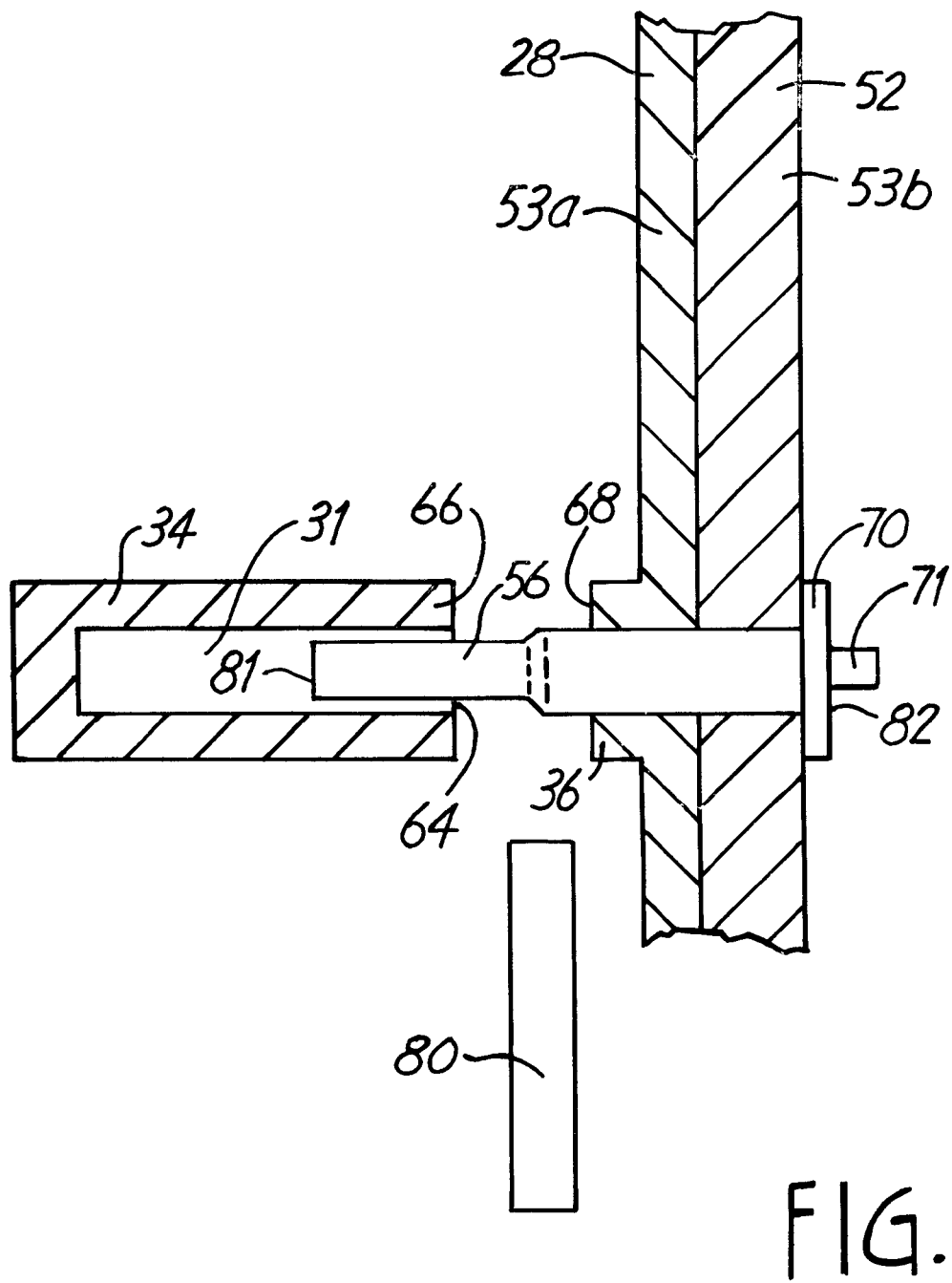
FIG. 6 is a side schematic view of a third step in the methodology of FIG. 4, wherein the heater has been withdrawn after heating the mating faces, and the alignment member is placed into a bonding position.

In the next step, shown in FIG. 6, in preparation for fusibly contacting mating faces 66 and 68, heater 80 is withdrawn and alignment member 56 is inserted through the backside 53b of jig 52 so that the matched cross-section portion of alignment member 56 underlies the bond site at which sleeve 34 and boss 36 will be joined. Alignment member 56 is thus in a bonding position. First end 81 of alignment member 56 projects outward from top cover 28 toward and into sleeve 34.

Figure 7:
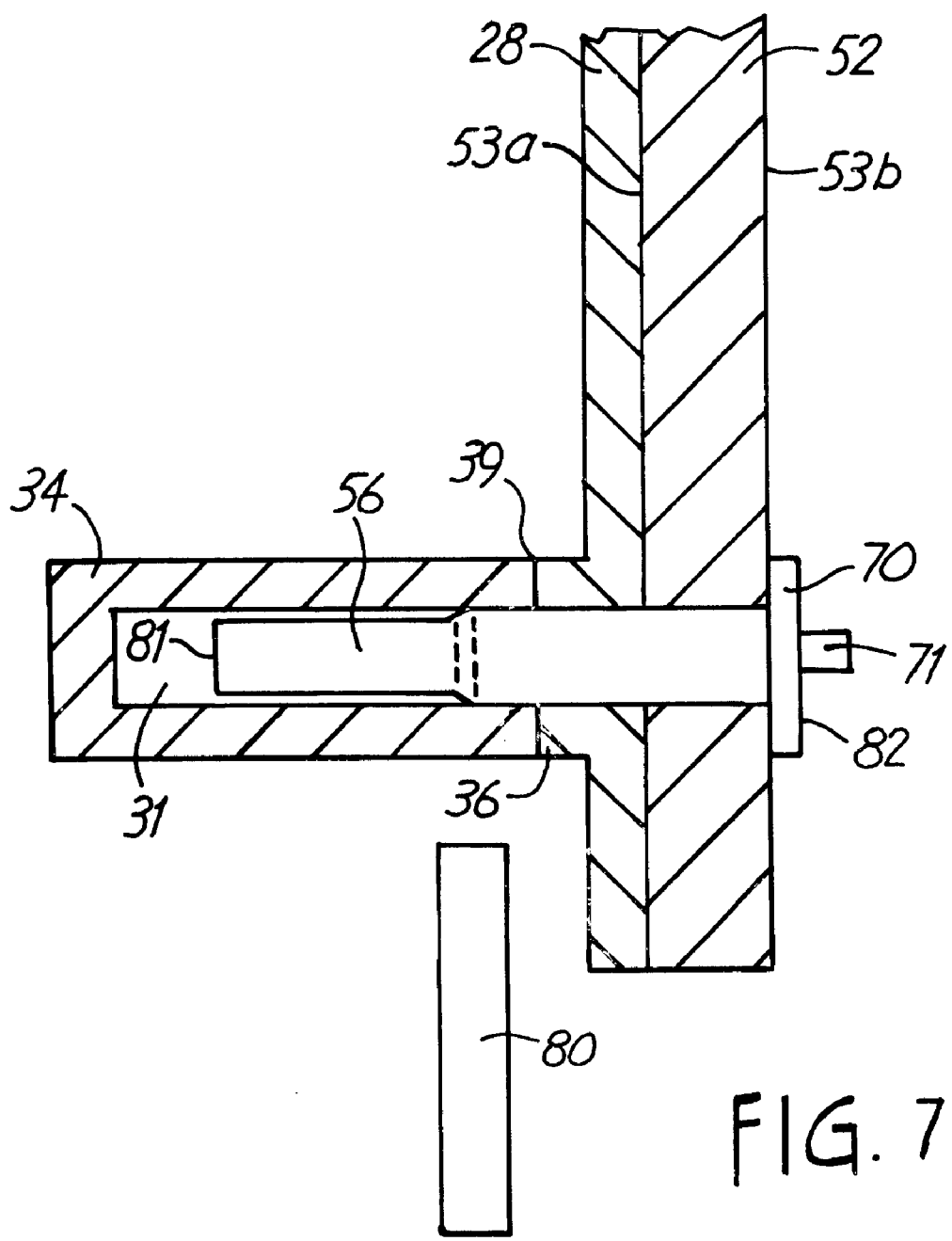
FIG. 7 is a side schematic view of a fourth step in the methodology of FIG. 4, wherein the sleeve is moved into bonding contact with the cover and wherein the joint between the parts is supported by the alignment member.

In the next step, shown in FIG. 7, sleeve 34 is slid over alignment member 56 toward top cover 28 until mating faces 66 and 68 fusibly contact. Advantageously, alignment member 56 helps guide sleeve 34 toward boss 36. Additionally, alignment member 56 ensures that sleeve 34 and boss 36 are properly aligned. Member 56 also helps ensure that the interior of the joint 39 formed between faces 66 and 68 is smooth and defect free, making it easy to fit the resultant structure onto uprights 26 (FIG. 3) and turntable platform 12 (FIG. 3). In the absence of alignment member 56, a bead (not shown) of fused material might otherwise form on the interior at joint 39 as mating faces 66 and 68 are pressed together. Such a bead, if present, might prevent or adversely affect the fit of the encapsulating structure. While alignment member 56 is in the bonding position, contacting mating faces 66 and 68 are allowed to cool and fuse together. A strong, impermeable weld joint 39 forms.

Figure 8:
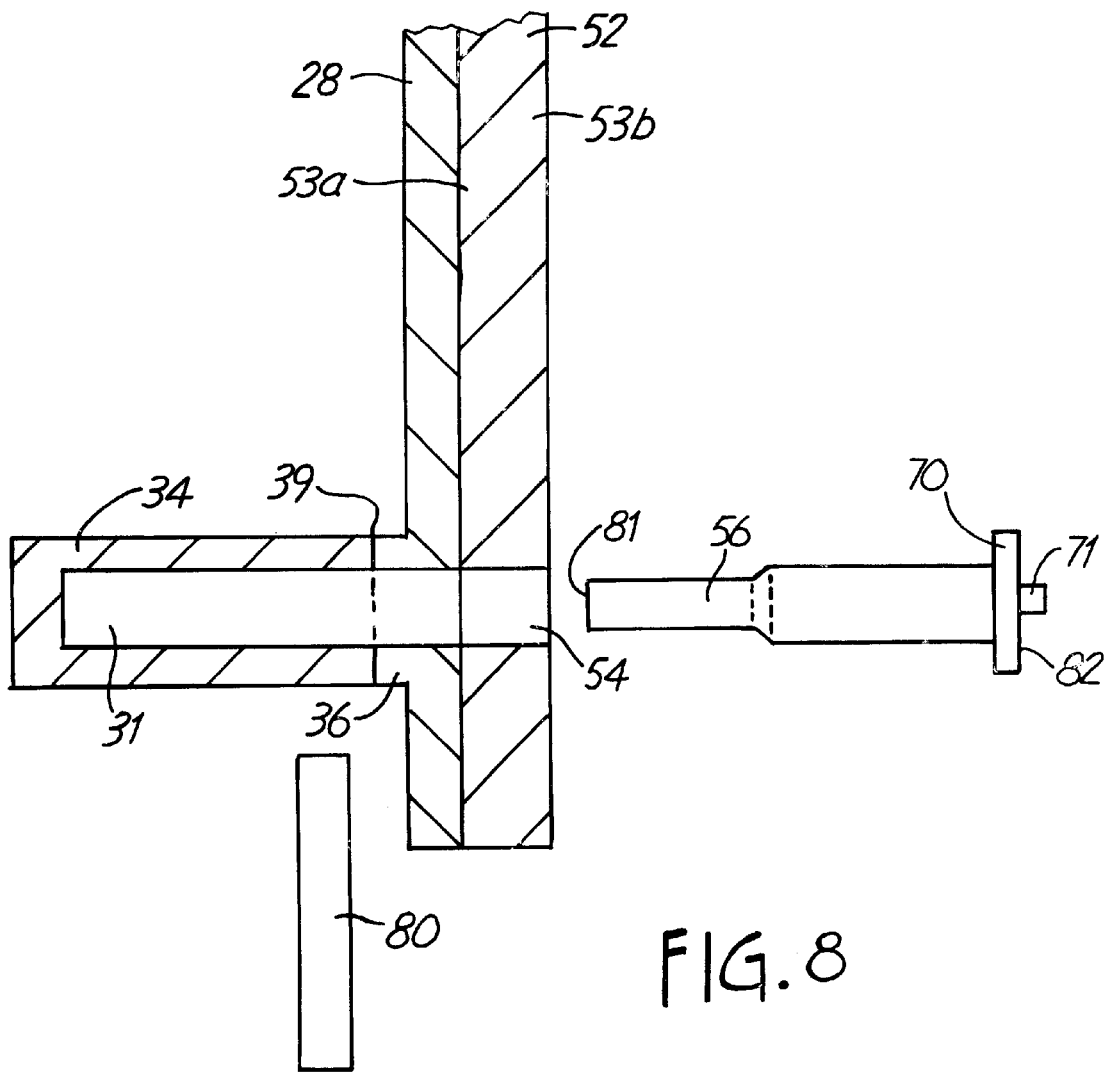
FIG. 8 is a side schematic view of a fifth step in the methodology of FIG. 4, wherein the alignment member has been withdrawn and the bond has been formed between the sleeve and the cover.

After the weld joint 39 has cooled sufficiently, alignment member 56 can be withdrawn as shown in FIG. 8. The same process as shown in FIGS. 4 to 8 can then be used to attach other sleeves to their corresponding bosses.

In some applications in which the techniques of the invention are used to accurately bond other kinds of ducts together, it may not always be practical to withdraw an alignment member after a joint is formed. For example, the geometry of the bonded structure may physically obstruct withdrawal. A number of options are available to deal with this scenario. In some instances, the alignment member can be left in place if it does not impair the intended function of the structure. In other instances, the alignment material can be made from a soluble material that can be removed by flushing the interior with a suitable solvent.

FIGS. 9 to 13 show a particularly preferred apparatus 100 that is suitable for bonding parts together in accordance with the principles of the present convention. Apparatus 100 includes five main subassemblies. These are support structure 102, turntable assembly 104, heater assembly 106, sleeve support assembly 108, and sliding stop assembly 110.

Support structure 102 includes upper frame 112 and lower frame 114 that are supported upon legs 115. Adjustable feet 116 allow support structure 102 to be leveled as needed. Main tabletop 118 is secured to upper frame 112 and includes hole 120 to provide heater assembly 106 with egress through main tabletop 118. Pillars 122 are securely mounted to main tabletop 118. A u-shaped support plate 124 is secured to the pillars 122. Support plate 124 includes gap 126 in its top mid-section to allow turntable assembly 104 to travel up and down (see below). Auxiliary tabletop 128 is supported over main tabletop 118 upon crossbeams 130 (only one of which can be seen in the figures). Auxiliary tabletop 128 includes hole 132 which is positioned directly over hole 120 of main tabletop 118. In a manner similar to hole 120, hole 132 provides heater assembly 106 with egress through auxiliary tabletop 128. A pair of parallel tracks (not shown) run along the length of auxiliary table top 128 and are operatively coupled to sleeve support assembly 108 and sliding stop assembly 110, thus allowing sleeve support assembly 108 and sliding stop assembly 110 to be slid back and forth over auxiliary tabletop 128.

The rotatable turntable assembly 104 includes turntable jig 136 having a plurality of through apertures 138 extending from the front face 140 to rear face 142. For purposes of illustration, apertures 138 are shown as circular holes positioned in a circular pattern on turntable jig 136. In actual practice, however, the shape, number, and position of apertures 138 will match corresponding apertures on the cover (not shown) that will be mounted onto turntable jig 136 during bonding operations. Turntable jig 136 is secured to face plate 144 of shaft assembly 146 in any convenient manner. Preferably, however turntable jig 136 is secured to face plate 144 using screws or bolts so that turntable to 136 can easily be removed for replacement, maintenance, or the like. When screws or bolts are used, these are preferably countersunk so as not to protrude from front face 140. Turntable jig 136 is thus rotatable about axis of rotation 148 which allows successive apertures 138 to be rotated into a bonding position at which each such aperture 138, and the corresponding aperture of the cover (not shown) mounted onto jig 136, may be easily aligned with a corresponding part 194 for carrying out bonding operations.

Shaft assembly 146 is secured to turntable carriage 150, which in turn is slideably coupled to each support plate 124 by a respective parallel track (not shown) running vertically along the length of each support plate 124. This allows the height of the entire rotatable turntable assembly 104 over auxiliary table top 128 to be adjusted. In the figures, for instance, turntable assembly 104 is in its lowest position, inasmuch as turntable carriage 150 is at the bottom of the tracks (not shown) on support plates 124. Turntable assembly 104 may be manually lifted and then secured to a higher position on the tracks using any convenient securing mechanism, e.g., pins. Optionally, a motor (not shown) could be operatively attached to union 147 so that shaft assembly 146 could be motor-driven if desired. As another option, union 147 can be used as a coupling to a vacuum source so that a vacuum could be pulled against a part mounted onto turntable jig 136.

Indexing disk 156 is fixedly secured to a portion of shaft assembly 146 that extends behind support plates 124. Like turntable jig 136, indexing disk 156 also is rotatably driven by the rotation of shaft assembly 146. Pneumatic clamp 158 is mounted to support plate 124 and may be actuated to grip and hold indexing disk 156 in a particular position. This, in turn, prevents shaft assembly 146 and turntable jig 136 from rotating as well. Thus, the operative engagement between pneumatic clamp 158 and indexing disk 156 provides a simple, convenient way to secure turntable jig 136 in a particular bonding position. In preferred embodiments, indexing disk 156 bears a plurality of indexing marks (not shown) that can be brought into successive alignment with a suitable reference mark. By correlating the spacing between successive indexing marks with the proper bonding position of successive apertures 138, turntable jig can be easily and rapidly moved through successive bonding positions for high throughput.

Figure 9:
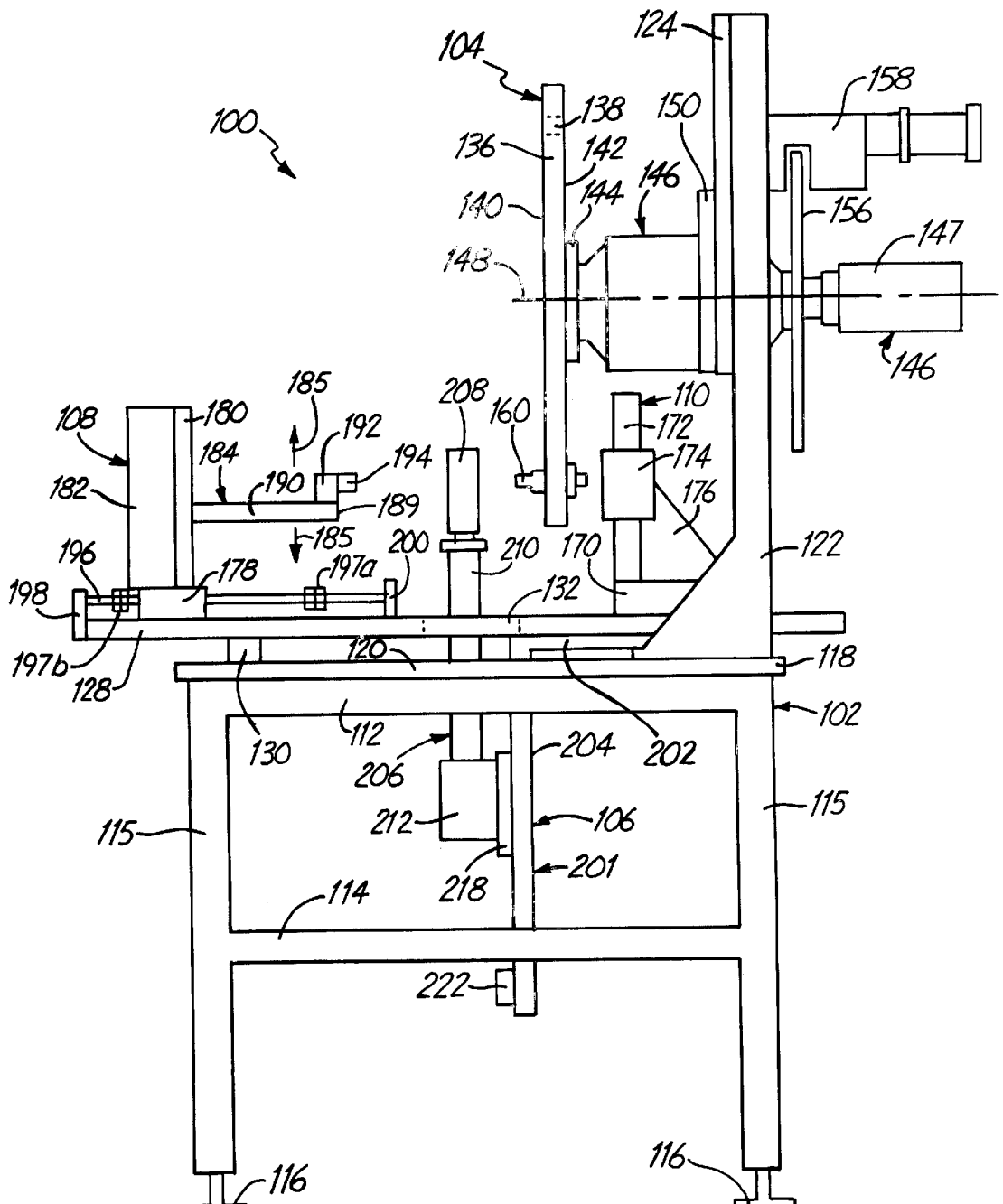
FIG. 9 is a side view of a preferred apparatus for carrying out the methodology illustrated in FIGS. 4 to 8.
Figure 10:
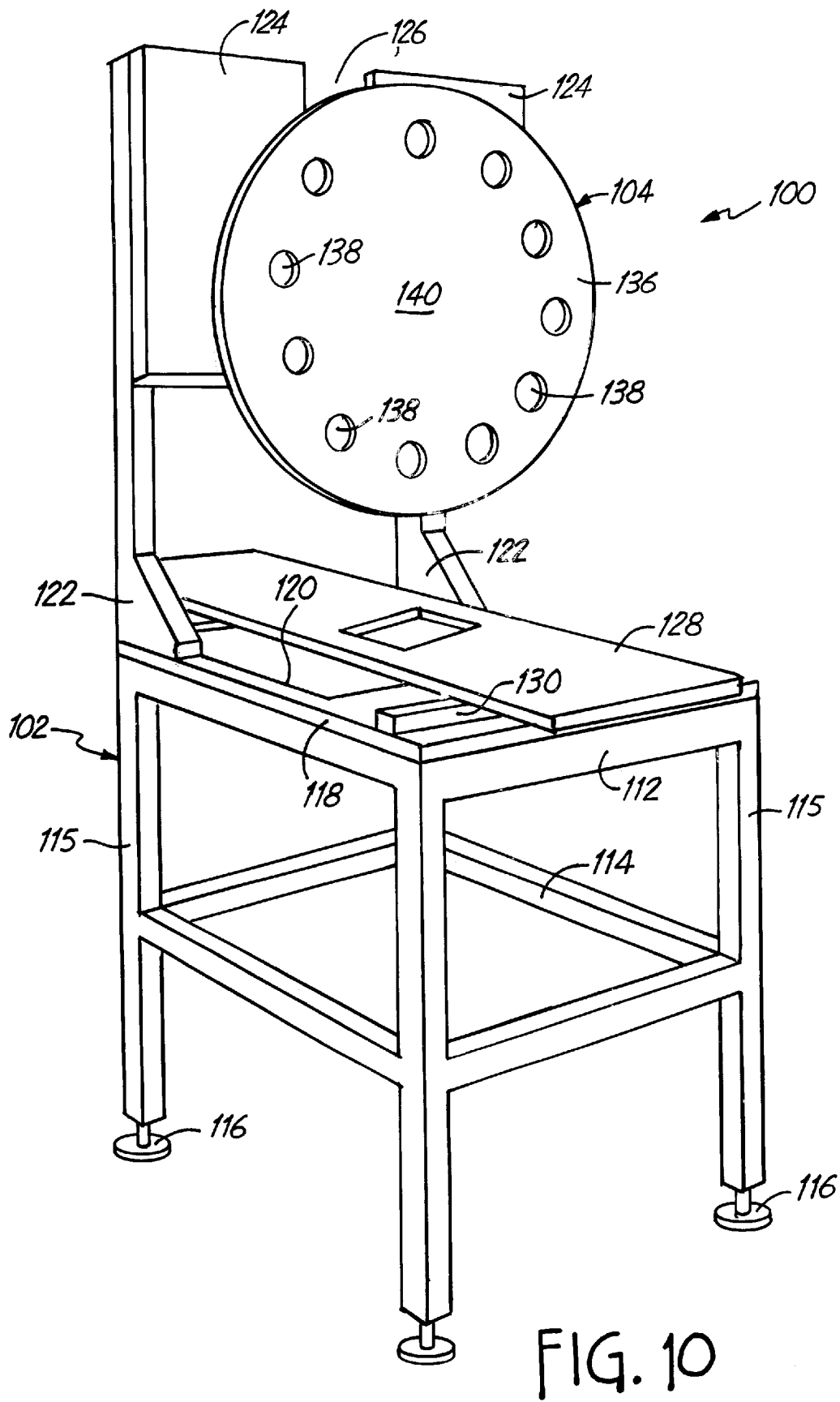
FIG. 10 is a perspective view of the apparatus of FIG. 9 with the sliding stop assembly, the sleeve support assembly, and the heater assembly removed.
Figure 11:
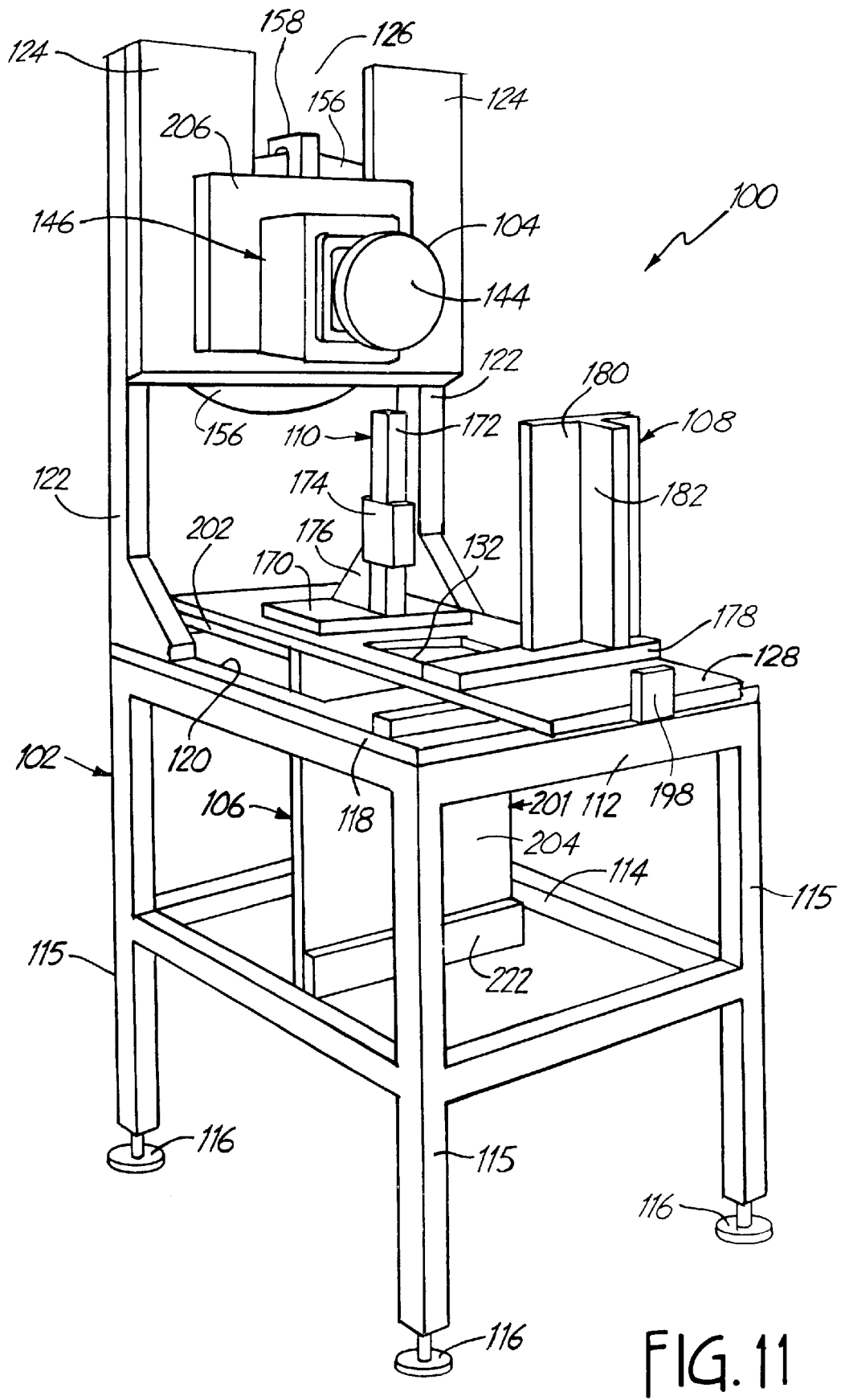
FIG. 11 is a perspective view of the apparatus of FIG. 9 with the turntable jig removed.
Figure 12:
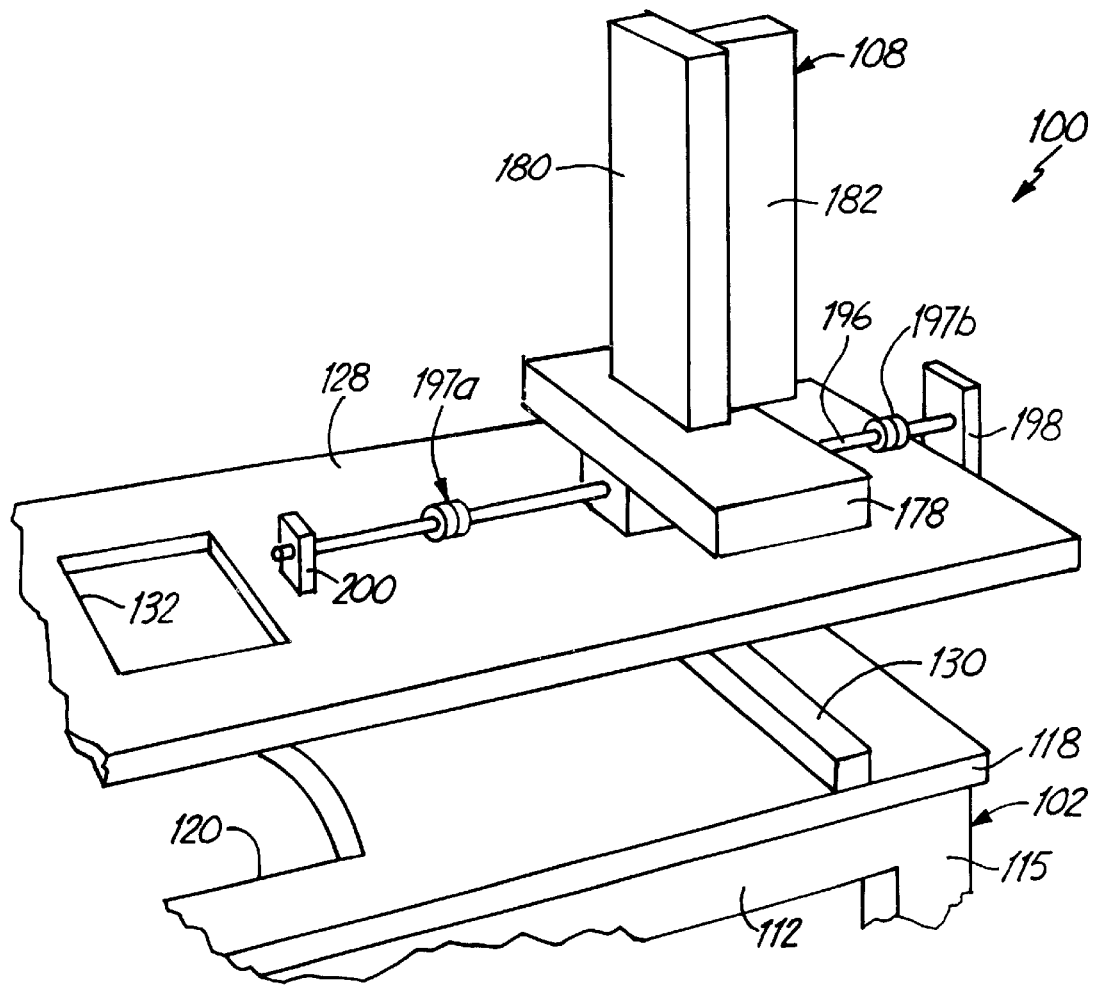
FIG. 12 is a perspective view of a portion of the apparatus of FIG. 9 showing the sleeve support assembly, except that the sleeve holder that projects from the vertical post has been removed.
Figure 13:
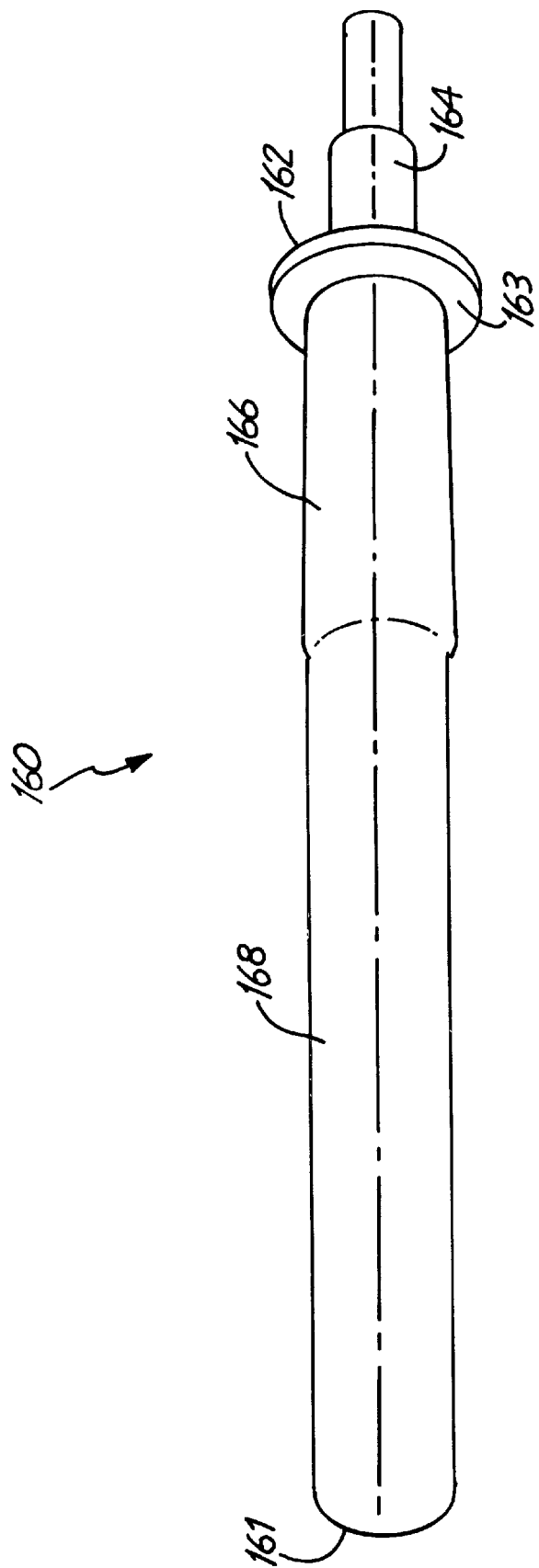
FIG. 13 is a perspective view of a preferred embodiment of an alignment member.

FIG. 9 shows a preferred alignment member in the form of mandrel 160 removeably inserted into an aperture 138 that happens to be in a bonding position. FIG. 13 is a perspective view of mandrel 160. Generally, mandrel 160 has first end 161 and second end 162. Proximal to first end 161, mandrel 160 has a reduced cross-section to facilitate insertion into the interior 31 of sleeve 194. Proximal to second end 162, the cross-section of mandrel 160 matches the cross-section of the aperture of the part (not shown) mounted over turntable jig, 136 and the mouth of sleeve 194. The matched cross-section allows mandrel 160 to firmly and snugly support the interior of the bond between sleeve 194 and the mounted part during the bonding step described below. Flange 163 serves as a stop to prevent mandrel 160 from being pushed too far through aperture 138, and stem 164 provides a bearing surface against which pressure can be applied to push and/or hold mandrel 160 into its bonding position in aperture 138 as shown in FIG. 9. Stem 164 also provides away to grip 30 mandrel 160 when it is to be removed from jig 136.

Referring collectively to FIGS. 9–13, sliding stop assembly 110 includes carriage 170 that operatively engages parallel tracks (not shown) on the auxiliary table top 128 so that sliding stop assembly 110 can be slid toward and away from rear face 142 of turntable jig 136. Post 172 extends perpendicularly upward from carriage 170 and includes an enlarged portion in the form of stop block 174. Stop block 174 is positioned so that stop block 174 can push against stem 164 of mandrel 160. A triangular brace helps support post 172 and stop block 174.

Sleeve support assembly 108 includes carriage 178 that operatively engages the parallel tracks on auxiliary table top 128 so that sleeve support assembly 108 can be slid toward and away from front face 140 of turntable jig 136. There is also a track (not shown) running across the width of auxiliary table top 128 so that sleeve support assembly 108 also can be moved across auxiliary table top 128 to fine tune its position. Vertical post 180 extends perpendicularly upward from carriage 178 and is supported by brace 182. Sleeve holder 184 is slideably mounted to vertical post 180 so that the height of sleeve holder 184 over auxiliary table top 128 can be adjusted (as shown by arrows 185), preferably while sleeve holder remains horizontal and parallel to auxiliary table top 128. This ability to raise or lower sleeve holder 184 facilitates alignment between sleeve 194, the part (not shown) mounted to turntable jig 136, and mandrel 160 during bonding operations. Preferably, sleeve holder 184 is mounted to vertical post 180 using parallel tracks (not shown) that run vertically along the length of vertical post 180 and that operatively engage proximal end 188 of arm 190. Arm 190 preferably extends perpendicularly from vertical post 180. At its distal end 189, member 192 extends upward and is configured to support sleeve 194 extending from flange 192.

In order to limit the range of motion of sleeve support assembly 108, carriage 178 is slideably coupled to rod 196 that is mounted between rear brace 198 and front brace 200. Respective pairs of nuts 197a and 197b can be positioned on rod 196 as stops to limit the range of motion of sleeve support assembly 108. Sleeve support assembly 108 is moved and held in position manually in this particular embodiment.

Heater assembly 106 includes slideable carriage 201 formed by horizontal base 202 and vertical plate 204 that extends downward perpendicularly from the end of horizontal base 202. Horizontal base 202 is operatively coupled to a pair of parallel tracks (not shown) located on the underside of auxiliary table top 128 so that heater assembly 106 can be translated back and forth in directions along the length of auxiliary table top 128. Base 218 of heater 206 is slideably coupled to vertical plate 204 upon a pair of parallel tracks (not shown) so that heater 206 can be raised and lowered through apertures 120 and 132. Pedestal 212 and post 210 are attached to slideable base 218 and support heater element 208. Thus, when base 218 is raised, heater element 208 can be positioned in a confronting relationship to the mating faces on sleeve 194 and the cover (not shown) that will be mounted onto turntable jig 136. Base 218, and hence pedestal 212, post 210, and heater element 208 can be manually raised to the desired raised position and then held in the desired position by a suitable releasable securing mechanism (not shown) such as a clamp, latch, lever, or the like. At the end of a heating operation, the securing mechanism can be released so that heater 206 can be allowed to fall to a lowered position using the force of gravity. A suitable shock absorbing mechanism 222, such as a spring mechanism, can be used to cushion the fall so that heater 206 is not damaged.

It is desirable to limit the back and forth horizontal motion of heater assembly 106 so that heater 206 can be raised and lowered through apertures 120 and 132 without striking the underside of either main table top 118 or auxiliary table top 128. This can be accomplished in any suitable way. As one approach, a suitable mechanical linkage assembly (not shown) may be operatively coupled to auxiliary table top 128 and vertical plate 204 as a means to limit the horizontal motion of heater assembly 106. A lever (not shown) could be coupled to the linkage assembly and is conveniently used by an operator to adjust the position of heater 206 for carrying out heating operations.

Apparatus 100 is particularly useful for accurately and efficiently bonding a plurality of sleeves to a turntable cover to provide a preassembled encapsulating structure to be used as illustrated in FIGS. 1–3. The operation of apparatus 100 is quite simple. Initially, heater 206 is in a lowered position, out of the way. A turntable cover (not shown) is mounted onto turntable jig, 136 so that apertures in the cover are matched with corresponding apertures 138 in turntable jig 136. Turntable cover can be secured onto jig 136 in any convenient manner. Using a circular array of bolts near the center of the cover and jig 136 in combination with a snap-fit engagement around the periphery of jig 136 has been found to be a suitable attachment technique.

If desired, a heat shield can be placed over the mounted cover so that substantially only the mating faces of the cover to be joined to corresponding mating faces of sleeves 194 are exposed. A suitable heat shield can be conveniently formed from a suitable insulating material such as a heat resistant fabric, stainless steel sheet, or the like, that can be secured in place using the same bolts used to secure the cover to jig 136.

The turntable jig 136 is rotated so (not shown) that one aperture 138 is in a bonding position. Pneumatic clamp 158 is actuated against indexing disk 156 to hold turntable jig in the desired position. During set up and alignment, however, clamp 158 may be released as needed to adjust the position of turntable jig 136. Also at the outset, sliding stop assembly 110 is backed away from rear face 142 of turntable jig 136, and mandrel 160 is not yet inserted through the aperture 138 in the bonding position. A sleeve 194 is mounted onto sleeve support assembly 110. If needed, arm 190 can be raised and lowered so that the aperture of sleeve 194 is accurately aligned with aperture 138 in the bonding position and the aperture in the cover.

Next, sleeve support assembly 108 is moved toward the cover mounted on turntable jig 136 so that the mating face on sleeve 194 is in a spaced apart confronting, relationship to the corresponding mating face on the cover. Sleeve support assembly 108 is desirably positioned so that heater element 208 can be raised and positioned parallel and substantially equidistant from both mating faces. Lever 216 can be used to fine tune the position of heater element 208 as needed.

With adjustments and alignments made, heating and bonding can take place. Heater 206 is raised to the desired heating position between the mating faces and actuated to heat and melt the proximal portions of the cover and sleeve 194 to be joined. When this degree of heating is accomplished, heater 206 is lowered out of the way, mandrel 160 is inserted through aperture 138 using sliding stop assembly 110 to push mandrel 160 all the way into its bonding position. Then, sleeve support assembly 108 is moved by the operator further toward the cover and turntable jig 136 to bring the heated mating faces into bonding contact. Contact is maintained long enough to allow the heated parts to cool and the resulting joint to strengthen. Both sleeve support assembly 108 and sliding stop assembly 110 are then moved away from turntable jig 136, and mandrel 160 is withdrawn. Pneumatic clamp 158 can then be released, allowing turntable 136 to be rotated so that a successive aperture 138 and corresponding aperture and mating face of the cover can be brought into a bonding position. The bonding process described above can then be repeated to bond the next sleeve 194 to this successive mating face of the cover.

Figure 14:
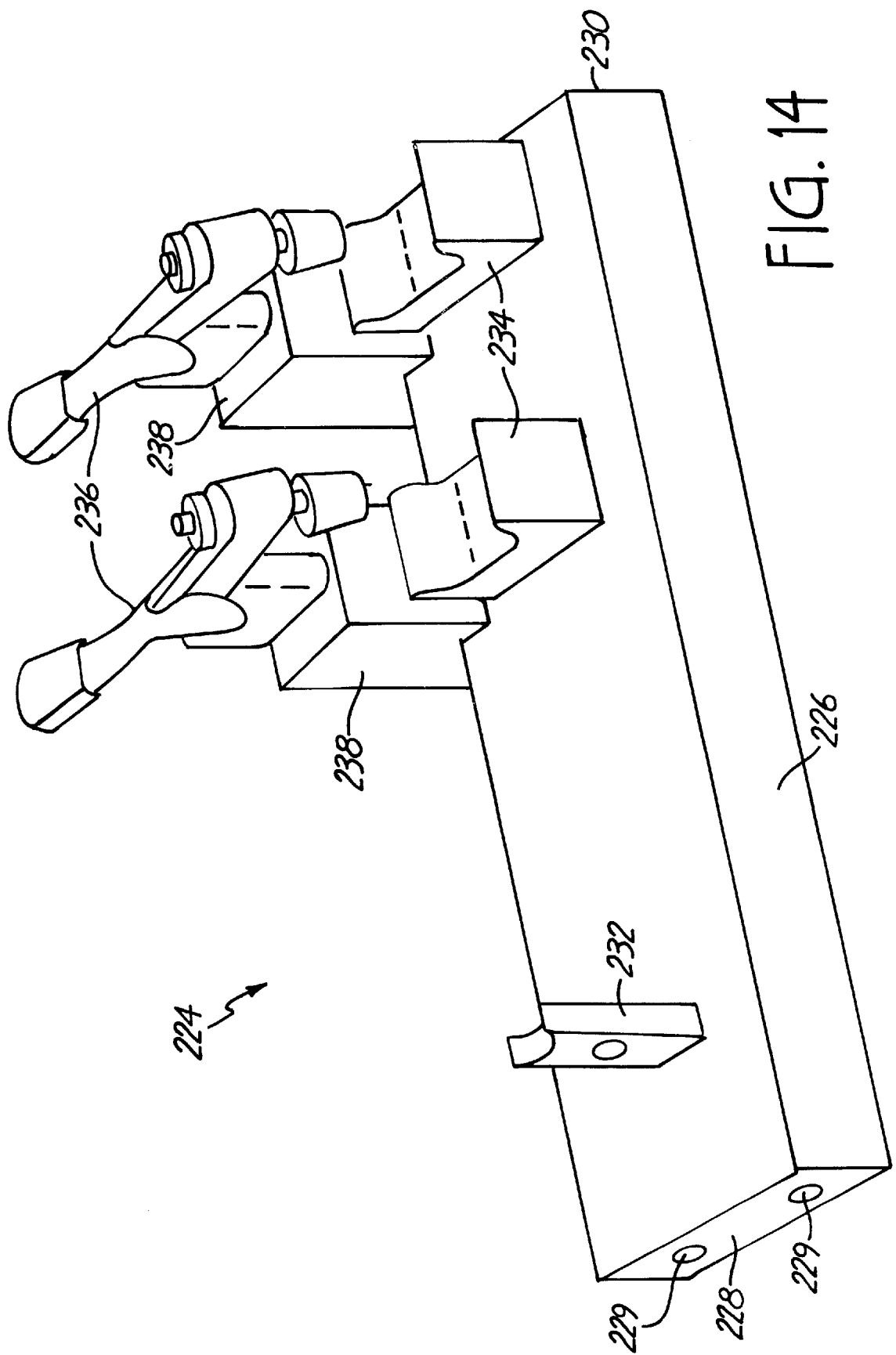
FIG. 14 is a perspective view of one embodiment of a sleeve holder that can be slideably attached to the sleeve holder shown in FIG. 12.

Of course, sleeve holder 184 shown in FIGS. 9–13 is just one representative embodiment of a structure that can be used to hold sleeve 194 in alignment during bonding operations. In actual practice, the particular design to be used is not critical. So long as sleeve 194 is held in proper alignment, any suitable design can be used. For example, FIG. 14 shows an alternative embodiment of a sleeve holder 224 that is suitable for holding longer sleeves (not shown in FIG. 14). Sleeve holder 224 includes arm 226 having first end 228 and second end 230. First end 228 would be attached to vertical post 180 (FIG. 9). The sleeve would be supported upon rest 232 at one end and a pair of cradles 234 at the other end. The mating face end of the sleeve would over hang second end 230 so that the mating face end could be bonded to a corresponding cover. A pair of toggle clamps 236 are supported upon spacer blocks 238 and can be actuated to firmly hold the sleeve on sleeve holder 224. Sleeve holder 224 can be secured to sleeve support assembly 108 via bolt holes 229.

The present invention has been described above in connection with encapsulating a turntable of the MERCURY® centrifugal spray processor. It can be appreciated, however, that the present invention is not limited to use with this particular structure, but can be used to encapsulate a wide variety of different structures in which an encapsulation joint is to be formed around the periphery of the structure.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of encapsulating at least a portion of an article comprising a surface and a plurality of structures projecting from the surface, said method comprising the steps of:

(a) providing a first encapsulating component comprising a plurality of through ducts, said through ducts corresponding to at least a portion of said projecting structures such that said portion of the projecting structures fit through the through ducts when the first encapsulating component is positioned over the surface of the article;

(b) providing a second encapsulating component comprising a duct corresponding to a through duct of the first encapsulating component, said duct of the second encapsulating component defining at least a portion of an encapsulating chamber for receiving a projecting structure when the duct of the second encapsulating component is bonded to the corresponding duct of the first encapsulating component;

(c) rotatably supporting the first encapsulating component with a jig; inserting an alignment member through an aperture in the jig;

(d) bonding the duct of the second encapsulating component to the corresponding through duct of the first encapsulating component to form a pre-assembled encapsulating structure, said bonding occurring while the ducts are supported in alignment with each other on the alignment member;

(e) after bonding the ducts together, removing the alignment member from the pre-assembled encapsulating structure and the jig;

(f) optionally bonding one or more additional encapsulating components to the first encapsulating component; and (g) fitting the pre-assembled encapsulating structure over the article in a manner such that a projecting structure is received in the encapsulating chamber.

2. The method of claim 1, wherein the first encapsulating component is an encapsulating cover structured to fit over the top of a turntable of a centrifugal spray processor.

3. The method of claim 2, wherein the second encapsulating component is a sleeve structured to fit over an upright projecting from the top surface of said turntable.

4. The method of claim 1, wherein each of the first and second encapsulating components comprises a thermoplastic fluoropolymer.

5. The method of claim 1, wherein two or more encapsulating components are successively bonded to the first encapsulating component.

6. The method of claim 1, wherein two or more encapsulating components are simultaneously bonded to the first encapsulating component.

7. A method of encapsulating an article with a bonded structure formed by joining a plurality of ducts of a plurality of polymeric members to corresponding through ducts of a polymeric body, the method comprising the steps of:

(a) rotatably supporting the polymeric body with a jig such that at least one through duct is in a bonding position; inserting an alignment member through an aperture in the jig;

(b) bonding a polymeric member to the polymeric body to form a bonded structure such that the duct of said polymeric member is aligned with the through duct of the polymeric body in the bonding position;

(c) during bonding, causing the alignment member to be positioned inside the ducts to be bonded together such that the joint between the ducts is supported by said alignment member;

(d) after bonding, removing the alignment member from the bonded structure and the jig;

(e) rotating the polymeric body to cause at least one successive through duct to be in a bonding position;

(f) bonding at least one additional polymeric member to the polymeric body; and (g) fitting the bonded structure onto the article to encapsulate at least a portion of the article.

* * * * *